(12) United States Patent
Goertzel et al.

(10) Patent No.: US 6,208,952 B1
(45) Date of Patent: Mar. 27, 2001

(54) METHOD AND SYSTEM FOR DELAYED REGISTRATION OF PROTOCOLS

(75) Inventors: Mario C. Goertzel, Kirkland; Richard D. Hill, Bellevue; Alexander A. Mitchell, Redmond; Bharat Shah, Newcastle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/738,432

(22) Filed: Oct. 24, 1996

(51) Int. Cl.[7] .................................................. G06F 12/02
(52) U.S. Cl. ........................ 702/203; 709/236; 709/228
(58) Field of Search ............................ 395/650, 200.57, 395/200.03, 200.33, 325, 500, 700, 856; 370/54, 60, 94.1, 469, 95.1; 371/32; 709/228, 213, 203, 236; 358/402

(56) References Cited

U.S. PATENT DOCUMENTS

| | | | |
|---|---|---|---|
| 5,153,884 | * 10/1992 | Lucak et al. | 371/32 |
| 5,452,433 | * 9/1995 | Nihart et al. | 395/500 |
| 5,515,508 | * 5/1996 | Pettus et al. | 395/200.01 |
| 5,574,728 | * 11/1996 | Mamaghani et al. | 370/95.1 |
| 5,613,096 | * 3/1997 | Danknick | 709/236 |
| 5,682,534 | * 10/1997 | Kapoor et al. | 395/684 |
| 5,699,350 | * 12/1997 | Kraslavsky | 370/254 |
| 5,724,155 | * 3/1998 | Saito | 358/402 |
| 5,727,149 | * 3/1998 | Hirata et al. | 709/213 |
| 5,774,662 | * 8/1998 | Sakagawa | 709/203 |
| 5,790,809 | * 8/1998 | Holmes | 709/228 |
| 5,894,557 | * 4/1999 | Bade et al. | 709/228 |
| 5,918,179 | * 6/1999 | Foladare et al. | 455/445 |

OTHER PUBLICATIONS

The Component Object Model Specification, *Draft*, Microsoft Corporation, Mar. 6, 1995, pp. 1–159 and 161–191.

Guntsch. Analysis of the ATDMA/PRMA++ protocol in a mobile satellite system environment.IEEE, May, 1996.*

Implementing Remote Procedure Calls, Birrell & Nelson, Xerox Palo Alto Research Center, Feb. 1984.*

* cited by examiner

Primary Examiner—Robert B. Harrell
Assistant Examiner—Thong Vu
(74) Attorney, Agent, or Firm—Klarquist Sparkman Campbell Leigh & Whinston, LLP

(57) ABSTRACT

A method and system for delayed registration of a remote protocol for communicating between a client computer system and a server computer system. The server computer system has a communications process that registers a plurality of protocols. When the client process needs to communicate with the server process, it sends a request to the communications process along with an indication of the protocols that it supports. The communications process selects a protocol that is supported by both the client computer system and the server computer system and directs the server process to register that protocol. The communication process provides the server endpoint for that protocol to the client process which can then communicate directly with the server process.

47 Claims, 13 Drawing Sheets

METHOD AND SYSTEM FOR DELAYED REGISTRATION OF PROTOCOLS

TECHNICAL FIELD

The present invention relates generally to computer-based methods and systems for communications, and, more particularly, to a method and system for registration of communication protocols.

BACKGROUND OF THE INVENTION

Computer systems typically have operating systems that support multitasking. A multitasking operating system allows multiple tasks (processes) to be executed concurrently. For example, a database server process may execute concurrently with many processes, which request services of the database server process. A client process (client) may request services by issuing a remote procedure call (RPC). A remote procedure call allows the server process (server) to invoke a server procedure on behalf of the client. To issue a remote procedure call, the client packages the procedure name and the actual in-parameters for the procedure into an interprocess communication message and sends the message to the server. The server receives the message, unpackages the procedure name and any actual in-parameters, and invokes the named procedure passing it the unpackaged in-parameters. When the procedure completes, the server packages any out-parameters into a message and sends the message to the client. The client receives the message and unpackages the out-parameters. The process of packing parameters is known as marshaling, and the process of unpacking parameters is known as unmarshaling. The marshaling and unmarshaling processes in general and the marshaling and unmarshaling of interface pointers in particular are described in U.S. Pat. No. 5,511,197, entitled "Method and System for Network Marshaling of Interface Pointers for Remote Procedure Calls," issued on Apr. 23, 1996, which is hereby incorporated by reference.

When a client issues a remote procedure call to a server, it designates a network address of the computer system upon which the server is executing, designates an endpoint (e.g., port) that has been allocated to the server, and designates a communications protocol by which the message is to be sent. In order for the server to receive the message, it needs to be listening on that endpoint for messages sent using the designated protocol. To start listening on an endpoint for messages sent using a protocol, a server typically registers the protocol with an RPC component that is loaded as a dynamic link library as part of the server. To start the server listening, the RPC component loads a dynamic link library that contains routines for processing the protocol, allocates an endpoint for the server, and typically creates a dedicated thread in the server to process messages received at that endpoint according to the protocol. The RPC component assigns an endpoint for the server for that protocol. When a message is received at that endpoint, the loaded routines interpret the message using the protocol and provides the message to the server.

Many different communication protocols have been defined for sending messages between two processes that are either executing on the same computer system or executing on different computer systems. These protocols include LRPC, TCP/IP, SPX, IPX, NetBios, ADSP, named pipes, and UDP. These various protocols have been developed to handle efficiently different communication environments. For example, LRPC (Local Remote Procedure Call) was developed to handle communications between processes executing on the same computer system, and the TCP/IP ("Transmission Control Protocol/Internet Protocol") protocol was developed to handle communications between processes executing on different computer systems. A system administrator typically would install various protocols on a computer system so that the programs (e.g., clients or servers) can communicate with a wide range of other programs on other computer systems. The identification of the installed protocols is generally stored in a system registry that is accessible by each executing computer program. When NRPC/DCOM server is launched, it typically checks the system registry to determine which protocols have been installed. ("DCOM" refers to the Distributed Component Object Model that allows COM objects to communicate with components and objects across network boundaries.) It then registers each protocol with the RPC component. As described above, the RPC component loads a dynamic link library containing an implementation of the protocol, allocates an endpoint, and typically creates a thread for each protocol. In addition, kernel mode drivers may be loaded and the endpoint may be registered with routines and other servers. This initialization process may take several seconds. Thus, there is a considerable overhead both in time and in use of system resources to register each communication protocol for a server. However, if a communications protocol is not registered, then the server cannot receive a message on that protocol from a client. For example, if a client can only transmit a message using the TCP/IP protocol and server has not registered that protocol, then the client and server cannot communicate. Thus, servers typically register every protocol that has been installed in their computer system so that they can communicate with as many clients as possible. However, as a result of each server registering each protocol, a substantial and possibly unacceptable overhead is placed on the computer system.

FIG. 1 illustrates the interconnection of clients with servers. The server 120 includes server application portion 121 and an RPC component 122. When the server is launched, it accesses the registry 130 to determine which protocols are installed on the computer system. Then for each of the protocols, the server registers that protocol with the RPC component. The RPC component creates the threads, loads the dynamic link libraries, and allocates the endpoints 123–127. The clients 110 either execute on the same computer system as the server or on a different computer system. A client includes a client application portion 111 and an RPC component 112. When the client attempts to send a message on a protocol, it registers that particular communication protocol that it will use to communicate with the RPC component. The RPC component creates a thread, loads the dynamic link library for the protocol, and allocates an endpoint 113. When the client is notified of the network address and the endpoint for the server that supports the protocol, the client can then send messages to the server. The combination of network address, protocol, and endpoint is referred to as a "string binding." Thus, a client needs to know the string binding of a server to send a message to the server. The particular endpoint that is allocated to a server for a protocol can either be specified by the server when the protocol is registered or assigned by the RPC component and provided to the server. If the server specifies the endpoint, then this endpoint is considered to be well known in that clients can be notified of the protocol and the endpoint even before the server is launched. Thus, clients can be programmed to communicate with the server over this wellknown endpoint. If, however, the RPC component assigns an endpoint, then the server needs to notify its clients of that endpoint before they can send messages to the server via that endpoint. In some implementations, the server computer system may have an endpoint mapper process that provides the endpoints of the various servers executing on the server computer system. In such a case, the client itself need not actually know the endpoint of the server. Instead, the client RPC component can retrieve the identification of the endpoint from the endpoint mapper process in a manner that is transparent to the client.

As discussed above, there is a substantial overhead involved in registering a protocol, which, of course, is unnecessary if no client communicates with the server using that protocol during the execution of the server. Moreover, this overhead is incurred on a per-server basis. That is, each server needs to register each protocol to communicate using that protocol. Nevertheless, the registering of multiple protocols, allows the server to communicate with various clients over different protocols. It would be desirable to have a system in which a server could still communicate with clients over various protocols, yet only incur the overhead necessary to support those protocols that are actually needed.

SUMMARY OF THE INVENTION

The present invention provides a method and system for delaying registration of a protocol for communicating between a client process and a server process on a computer system until requested by the client process. The delayed registration system provides a communications process that registers a protocol at a communications endpoint. In one embodiment, the server process sends to the client process an identification of the registered protocol. The client process then notifies the communications process that it wants to communicate with the server process via a certain protocol. The communications process requests that the server process register that certain protocol. After registering that protocol, the server provides the communications process with an identification of a server endpoint that was allocated for the protocol. The communications process sends that identification to the client process so that the client process can communicate directly with the server process. In this way, registration of protocol are delayed until a client process actually requests to communicate via that protocol.

DETAILED DESCRIPTION OF THE INVENTION

The present invention provides a method and system for delaying the registration of a communication protocol by a server process until a client process requests to communicate with the server process using that protocol. The delayed registration system of the present invention provides a communications process that executes on the same computer system as the server process and that registers each of the protocols supported by (i.e., installed on) the server computer system. These protocols are registered by the communications process at well-known endpoints. A client process requests to communicate with a server process by sending a message to the communications process, via a well-known endpoint of the communications process for a protocol that the client process supports. When the communications process receives the request, it notifies the server process to register a protocol identified in the request. The server process registers the protocol and returns an assigned server remote endpoint to the communications process. The communications process then returns the server remote endpoint to the client process. The client process can then directly communicate with the server remote process through the server endpoint. In this way, a server process can delay registering a protocol until a client process requests to communicate using that protocol.

Figure 1:
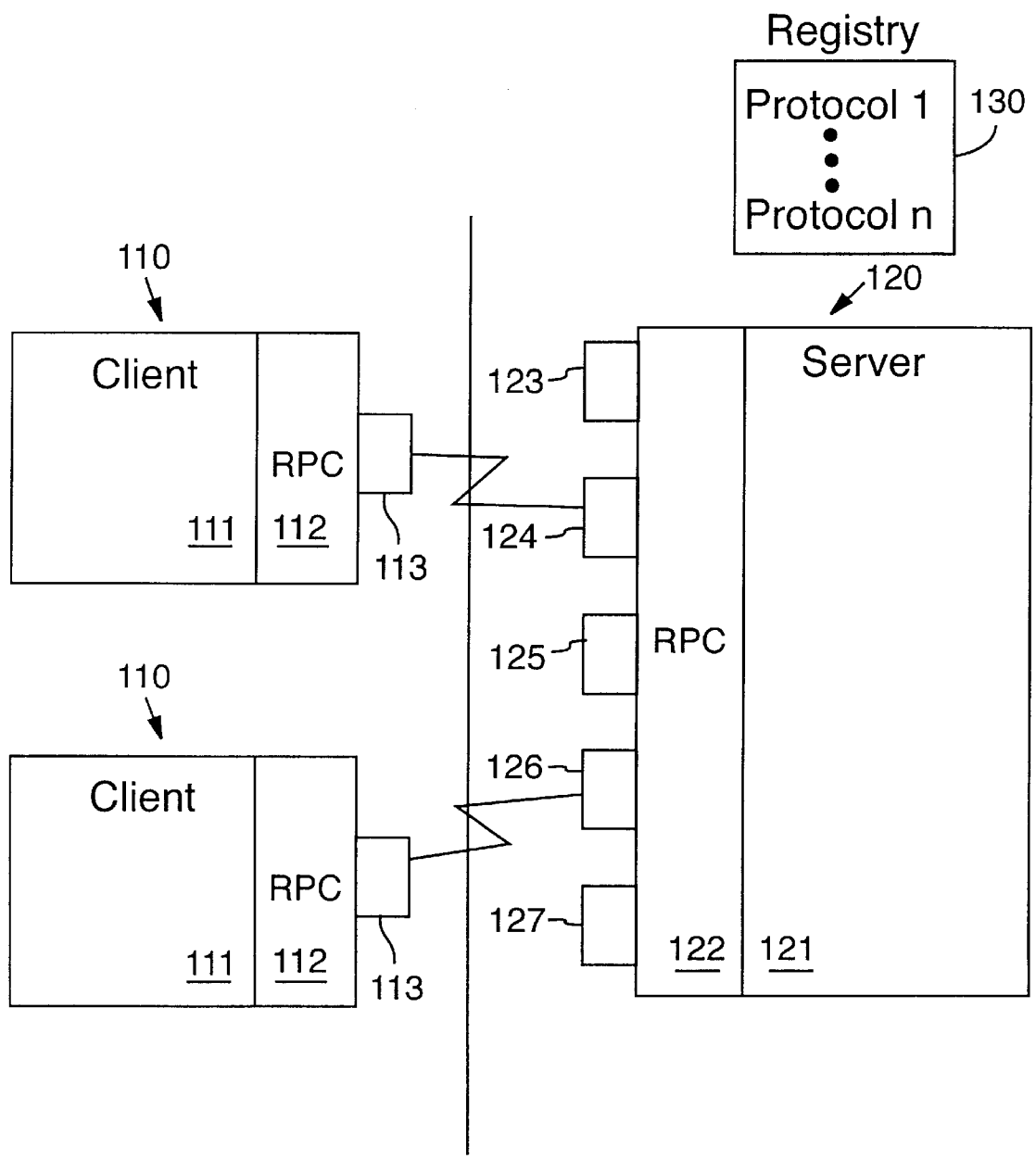
FIG. 1 illustrates the interconnection of clients with servers.
Figure 2:
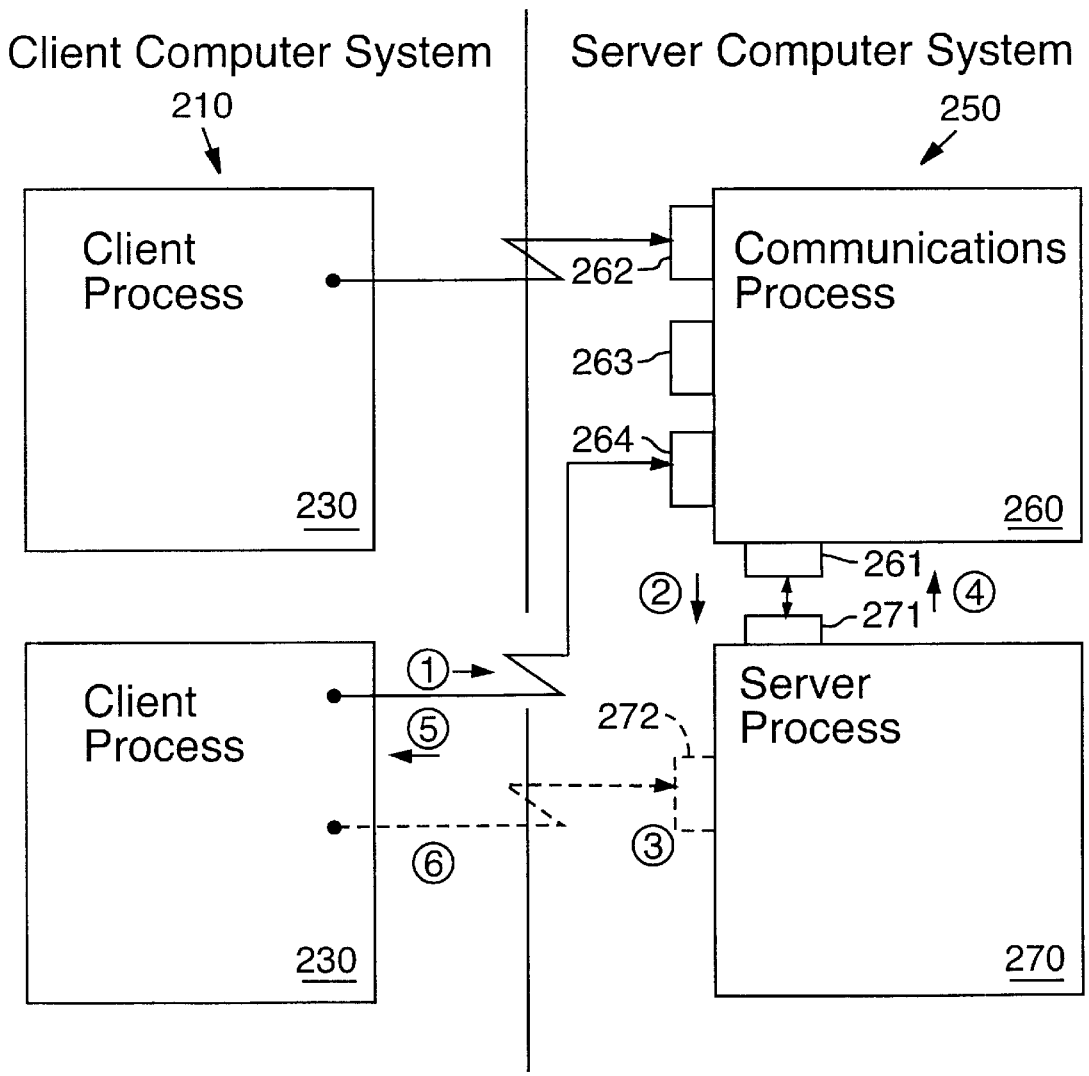
FIG. 2 is a block diagram illustrating the delayed registration process.

FIG. 2 is a block diagram illustrating the delayed registration process. The client computer system 210 contains client processes 230. The server computer system 250 includes communications process 260 and the server process 270. When the communications process initializes, it registers the various communication protocols supported by the computer system at well-known endpoints 261–264. A well-known endpoint is an endpoint that is known to the client processes. That is, a client process can specify the network address of a server computer system, a protocol, and the well-known remote endpoint (i.e., a string binding) to send a message to the communications process of that server computer system. The communications process also registers a well-known local endpoint that can be used for communicating with the processes on the same server computer system. (In the following, the term "remote endpoint" is used to describe an endpoint using a protocol (e.g., TCP/IP) that can be used for network communications, and the term "local endpoint" is used to describe an endpoint using a protocol (e.g., LRPC) that this is primarily intended for communicating between processes on the same computer system.) When the server process 270 initializes, it registers a local protocol and is allocated the server local endpoint 271. The server process notifies the communications process of that endpoint and of the identity of the server process. The server process, however, does not register any remote protocols at this time. When a client process needs to communicate with the server process through a certain protocol, the client process notifies (1) the communications process of the server computer system via a well-known endpoint, such as remote endpoint 264. That notification includes the identification of the server process with which the client process is to communicate and a list of protocols that the client process can use for communicating. When the communications process receives that notification, the communications process notifies (2) the server process via the server local endpoint 271 passing an indication of the protocol to be registered. The server process then registers the protocol and receives (3) identification of the server remote endpoint 272 allocated for that protocol. The server process returns (4) the identification of the server remote endpoint to the communications process as an [out] parameter of the call (2). The communications process then sends (5) to the client process the identification of the server remote endpoint as an [out] parameter of the call (1). The client process can then send (6) a message to the server process at the identified server remote endpoint. In this way, the server process can delay registering a protocol until the protocol is actually needed by a client process. Moreover, when the server computer system supports multiple servers, a substantial overhead is avoided by not registering all installed protocols for each server process.

Figure 3A:
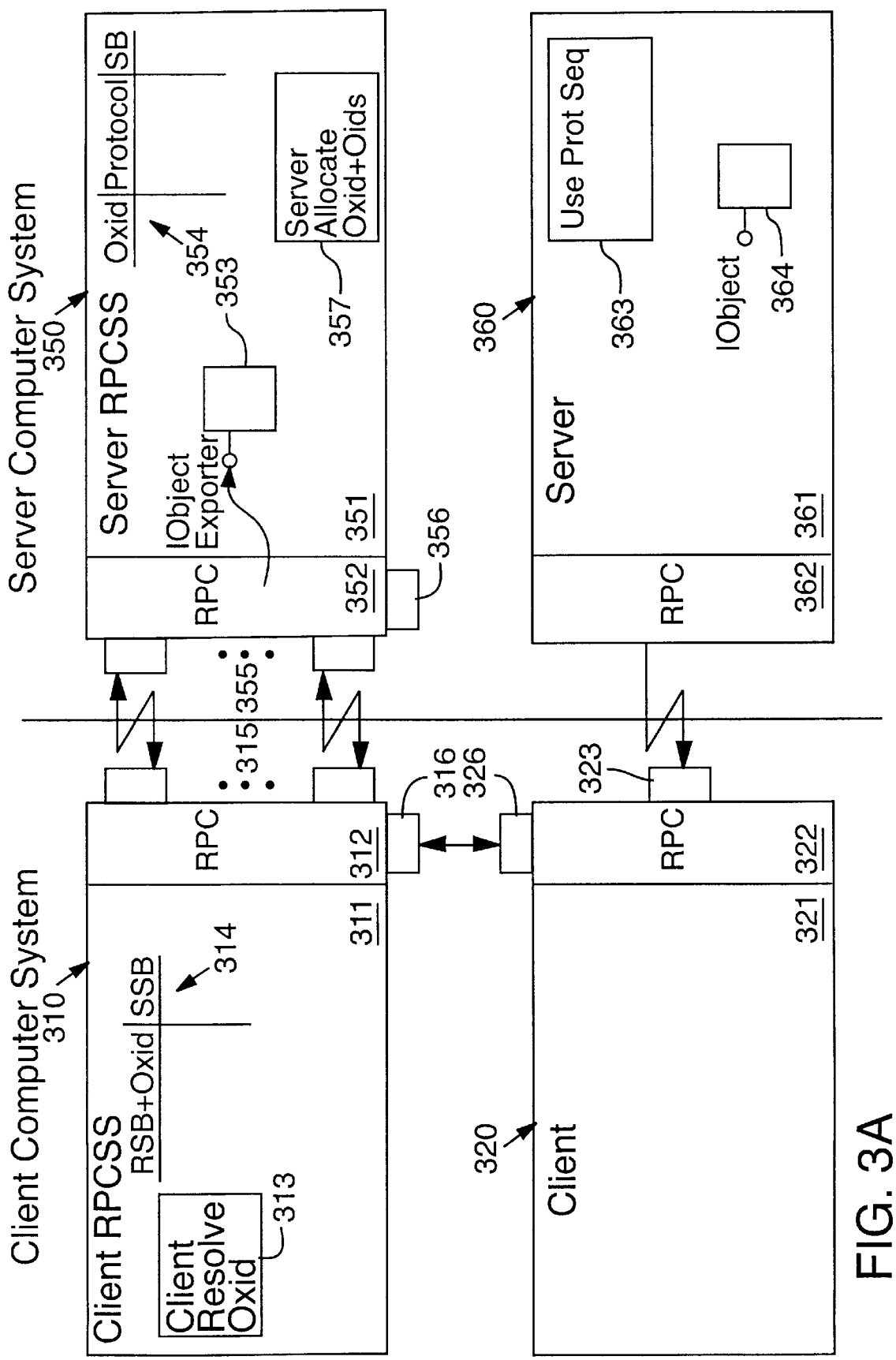
FIGS. 3A–3C are detailed block diagrams illustrating the components of a server computer system and a client computer system supporting delayed protocol registration.
Figure 3B:
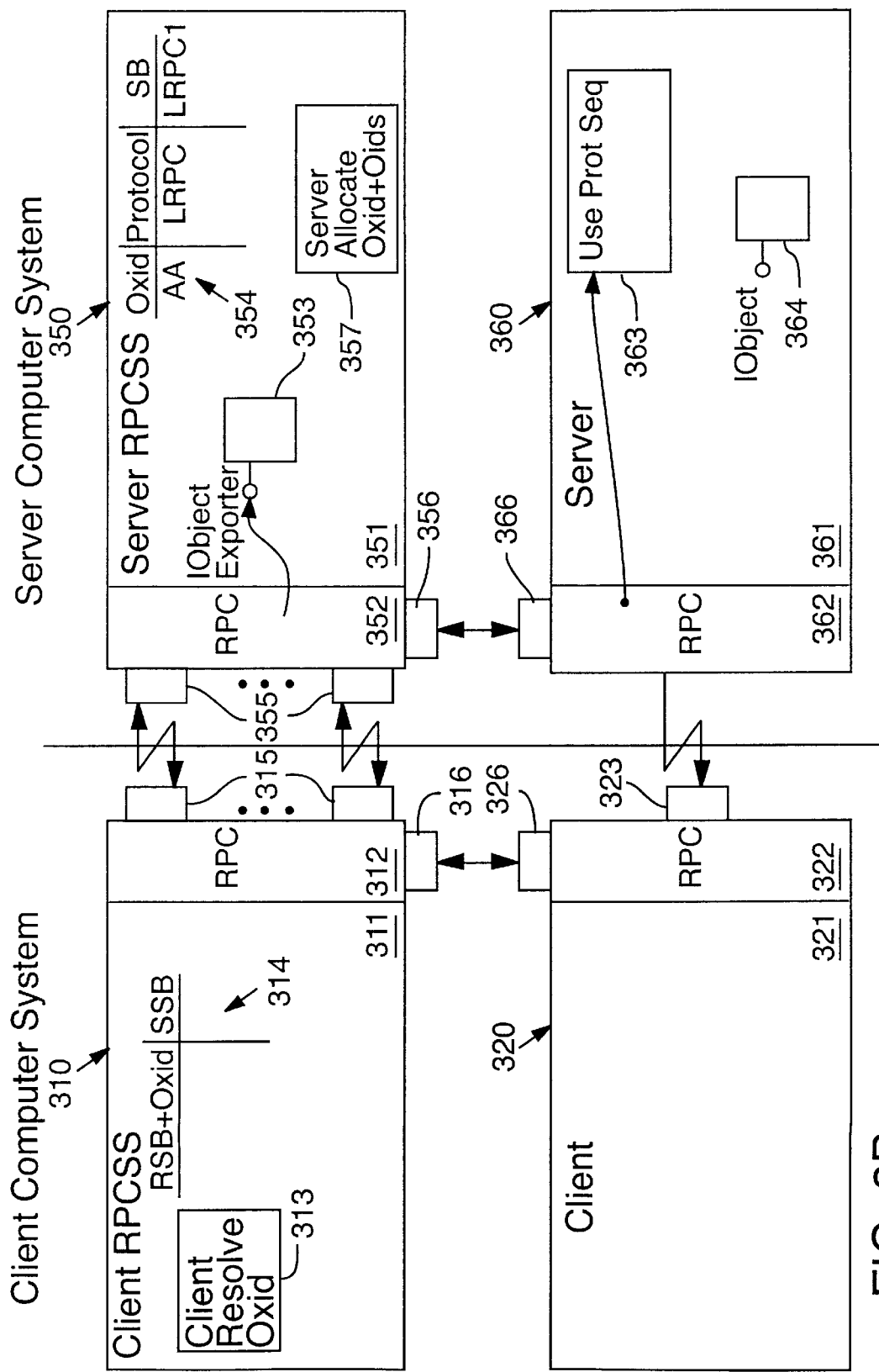
Figure 3C:
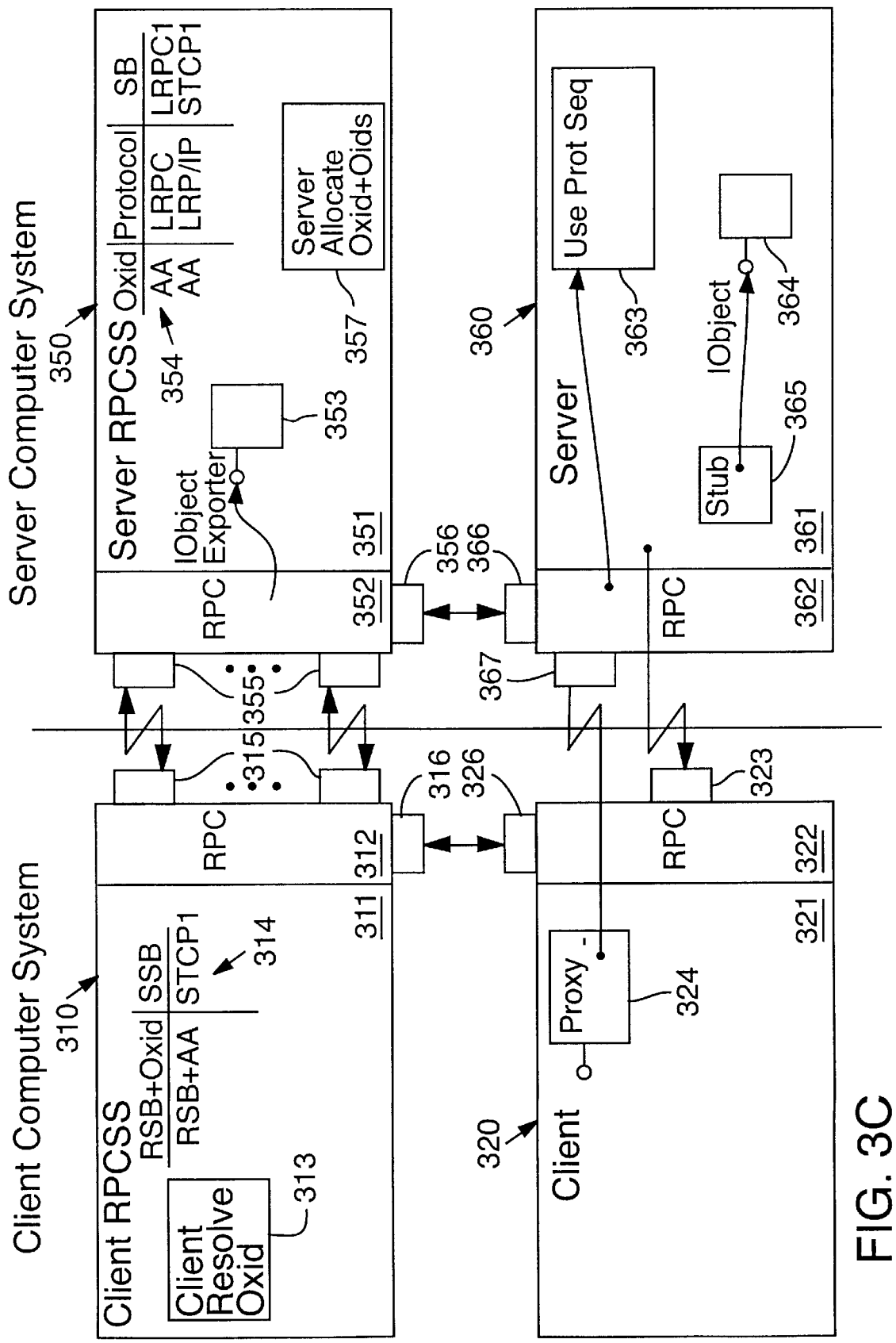

FIGS. 3A–3C are detailed block diagrams illustrating the components of a server computer system and a client computer system supporting delayed protocol registration. The client computer system contains a client RPCSS ("Remote Procedure Call Sub-System") process 310 and a client process 320. The client process contains client application portion 321, an RPC component 322, a client remote endpoint 323, and a client local endpoint 326 that is known to the client RPCSS process. The client RPCSS process is an implementation of a communications process and contains an RPCSS component 311 and an RPC component 312. The client RPCSS process has well-known client RPCSS remote endpoints 315 and a well-known client RPCSS local endpoint 316. The client RPCSS component contains a method ClientResolveOxid 313 of the interface ILocalObjectExporter and an Oxid/SSB table 314 that caches the identification of a server process to a server string binding (SSB) of a server remote endpoint previously requested by a client process of the client computer system. An Oxid uniquely identifies a process within a computer system. For example, the server process 360 has an Oxid that is unique within the server computer system, but not necessarily unique among other computer systems. The combination of server RPCSS string bindings and server Oxid uniquely identifies a process within a network, so the Oxid/SSB table uses this combination as the key. The Oxid/SSB table is a cache that contains the server string bindings that have been retrieved by the client RPCSS process. The server computer system contains the server process 360 and the server RPCSS process 350. The server process includes the server application portion 361 and an RPC component 362. The server application portion contains the method UseProtSeq 363 of the interface IORCallback and contains an object 364 whose interface is to be marshaled to a client process. The server RPCSS process is an implementation of a communications process and contains an RPCSS component 351 and an RPC component 352. The server RPCSS process has well-known server RPCSS remote endpoints 355 and a well-known local endpoint 356. The RPCSS component contains an IObjectExporter object 353, the method ServerAllocateOxidAndOids of the ILocalObjectExporter interface, and an Oxid/Protocol table 354 that caches the string bindings for each protocol registered by a server process on the server computer system.

FIG. 3A represents the state of the server computer system and the client computer system after the server RPCSS process and the client RPCSS process have been initialized, but before the server process has been initialized. FIG. 3B is a diagram illustrating the state of the server computer system and the client computer system after the server process has been initialized and is prepared to marshal the pointer to an object. During the initialization process, the server process registers with its RPC component a local protocol at a server local endpoint 366 via the ServerAllocateOxidAndOids method. The server process also registers the IORCallback interface with the RPC component. The server process passes an indication of the server local endpoint to the server RPCSS process. In return, the server RPCSS process assigns an Oxid to the server process and stores the Oxid, the identification of the local protocol, and the string binding for the server local endpoint 366 in the Oxid/Protocol table. The Oxid/Protocol table contains the Oxid of each server process along with the identification of each protocol that the server process has registered and the associated string binding. The server RPCSS process uses the Oxid/Protocol table as a cache from which it can return a server string binding to a client process when the server process has already registered a protocol that the client supports. The server RPCSS process sends the Oxid and the string bindings for the server RPCSS remote protocols to the server process as an [out] parameter of the ServerAllocateOxidAndOids method.

FIG. 3C is a block diagram illustrating the processing after the client process receives the marshaled interface pointer from the server process on client remote endpoint. When marshaling the interface pointer, the server process creates a stub 365 for directing invocations received from a client process to the object 364. The server process also creates a message that contains its Oxid and the server RPCSS string bindings along with the standard information needed to unmarshal an interface pointer. When the client process receives the marshaled interface pointer, it invokes the function CoUnMarshalInterface. The function CoUnMarshalInterface invokes the method ClientResolveOxid of the ILocalObjectExport interface of the client RPCSS process via the client RPCSS local endpoint passing the server RPCSS string bindings and the Oxid of the server process. The client RPCSS process decides from the server RPCSS string bindings to which server RPCSS remote endpoint 355 it wants to communicate and sends a message to the server RPCSS process to invoke the method ResolveOxid of the IObjectExporter interface passing the identifications of the protocols supported by the client RPCSS process. When the method ResolveOxid is invoked, the server RPCSS process checks the Oxid/Protocol table to determine that the server process has already registered a protocol that is supported by the client RPCSS process. If not, the server RPCSS process selects a protocol that both the server and the client RPCSS processes support. The method ResolveOxid then invokes the method UseProtSeq of the IORCallback interface of the server process that was registered with the RPC component. The method UseProtSeq registers the selected protocol for the server process and returns a server remote string binding for the server remote endpoint 367 allocated by the RPC component. The method ResolveOxid then sends the server remote string binding to the client RPCSS process. The client RPCSS process receives the server remote string binding and caches it in the Oxid/SSB table. The method ClientResolveOxid then returns to the client process the server remote string binding. The client process then uses the server remote string binding to establish a connection between the proxy object 324, which is instantiated as part of the unmarshaling, and the stub 365 by storing the server remote string binding in the proxy object. The client process then invokes a method of the proxy object to effect the invocation of the corresponding methods of the object 364. The proxy object marshals the identifier of the method to be invoked and its parameters and sends the marshaled data to the server remote endpoint identified by the stored server remote string binding. When the server process receives the data, the stub unmarshals the parameters and invokes the identified method of the object 364.

Figure 4:
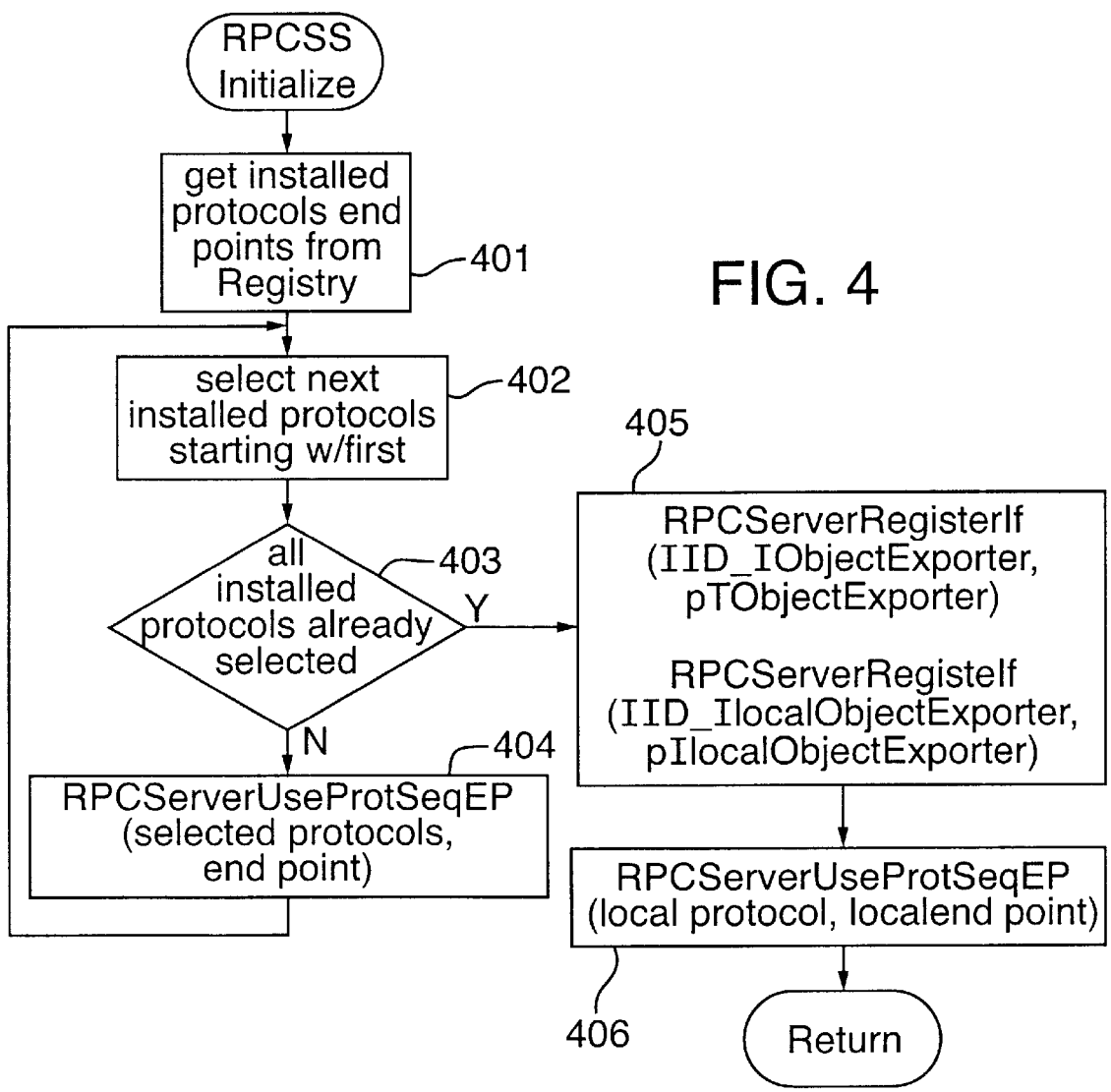
FIG. 4 is a flow diagram of an implementation of the initialization routine of the server aspects of RPCSS process.
Figure 5:
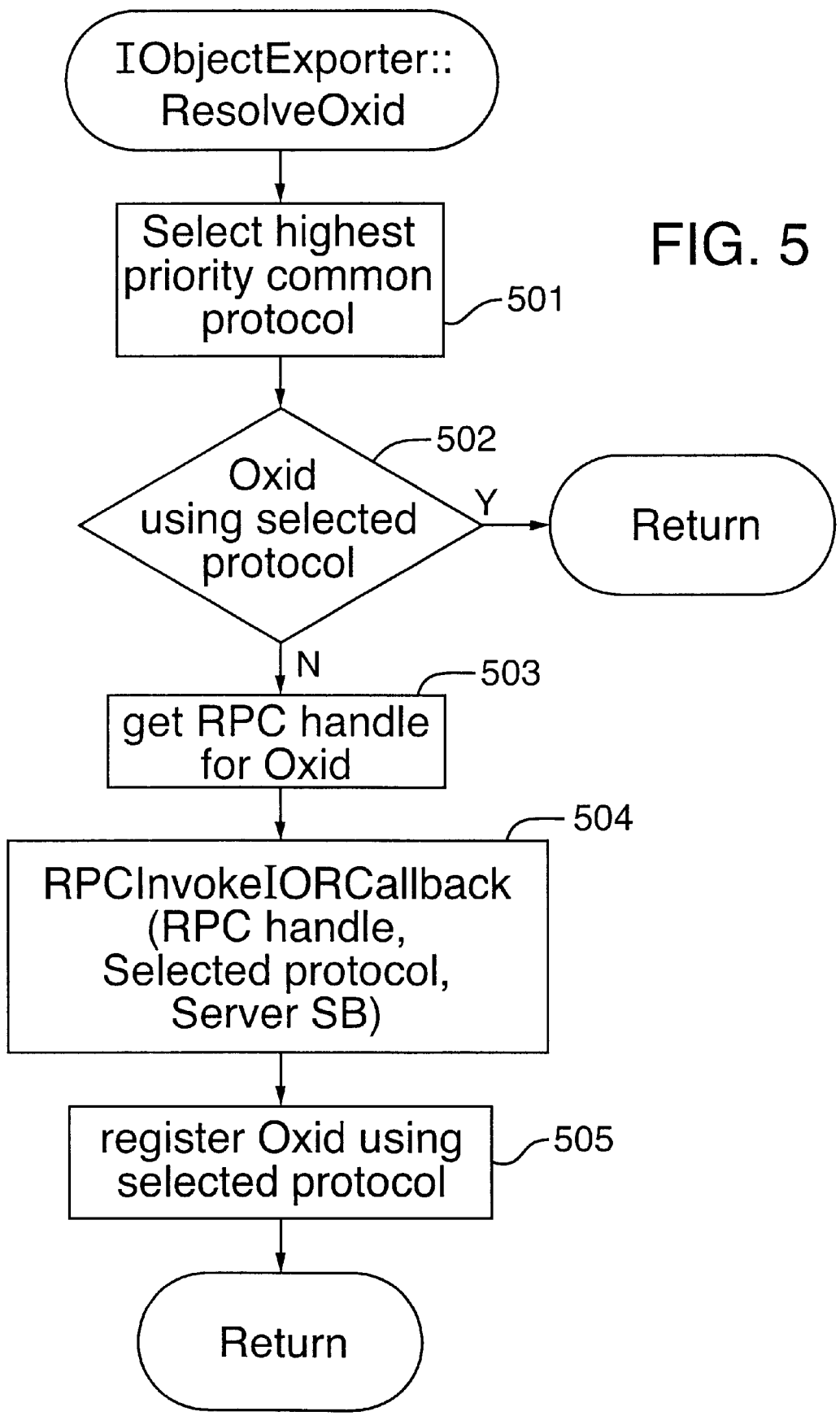
FIG. 5 is a flow diagram of an implementation of the method ResolveOxid of the IObjectExporter interface.
Figure 6:
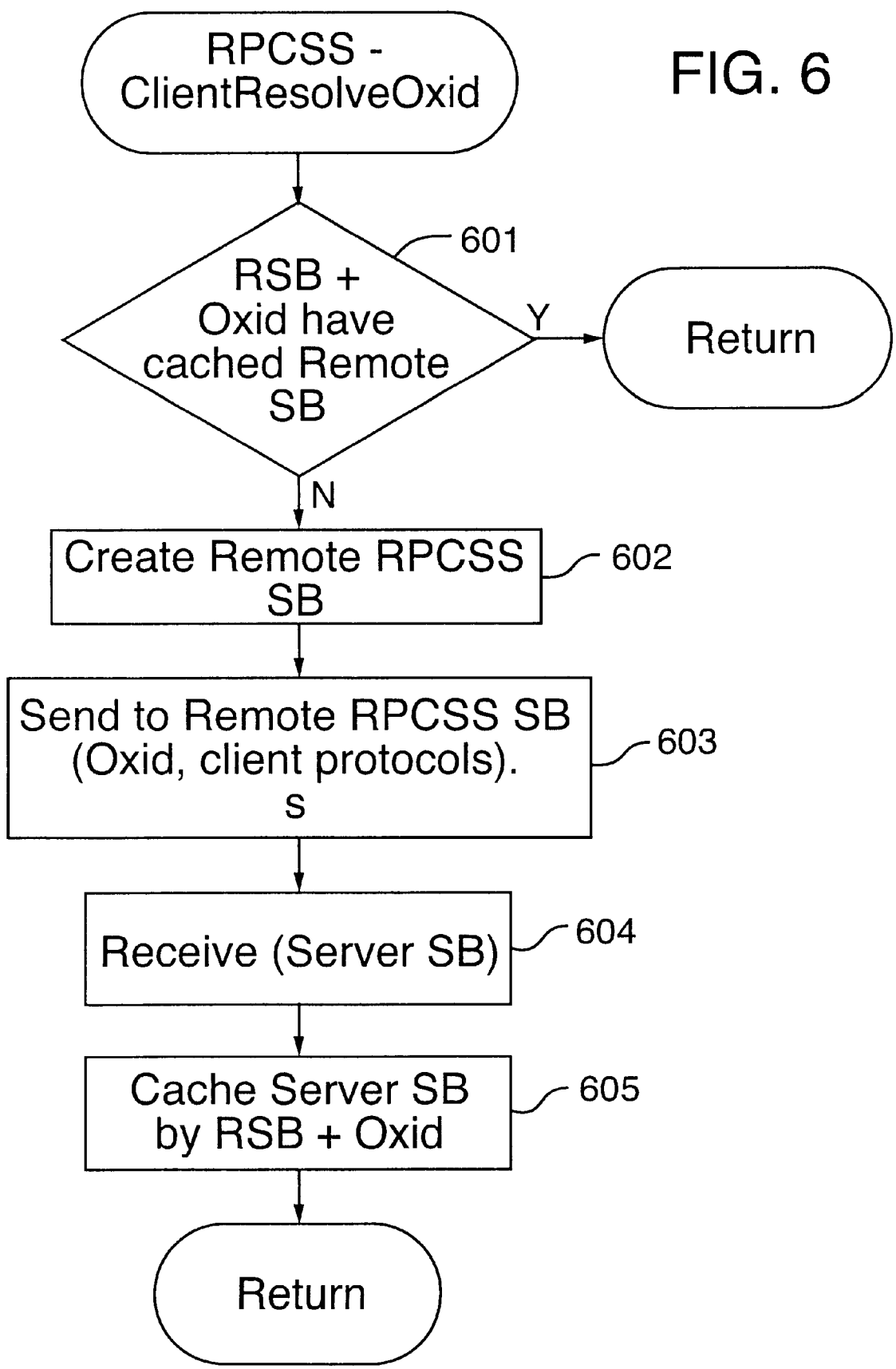
FIG. 6 is a flow diagram of an implementation of the method ClientResolveOxid of the ILocalObjectExporter interface.

FIGS. 4, 5, and 6 are flow diagrams of portions of the RPCSS process. FIG. 4 is a flow diagram of an implementation of the initialization routine of the server aspects of RPCSS process. The initialization routine retrieves the identifications of the protocols supported by (installed on) the computer system upon which it is executing, registers those protocols with the RPC component, registers its local protocol with the RPC component, and registers the IObjectExporter interface and the ILocalObjectExporter interface with the RPC component. In step 401, the routine retrieves the identification of any installed protocols and their associated wellknown endpoints from the system registry. In steps 402–404, the routine loops registering the installed protocols on the well-known endpoints. In step 402, the routine selects the next installed protocol starting with the first. In step 403, if all the installed protocols have already been selected, then the routine continues at step 405, else the routine continues at step 404. In step 404, the routine invokes the function RpcServerUseProtSeqEP to register the selected protocol at the well-known endpoint with the RPC component and loops to step 402 to select the next installed protocol. In step 405, the routine invokes the function RpcServerRegisterIf to register the IObjectExporter interface and the ILocalObjectExporter interface with the RPC component. In step 406, the routine invokes the function RpcServerUseProtSeqEP to register the local protocol at the local endpoint for the RPCSS process and returns.

FIG. 5 is a flow diagram of an implementation of the method ResolveOxid of the IObjectExporter interface. The method ResolveOxid is passed a list of protocols supported by a client RPCSS process and the Oxid of a server process. The method selects a protocol that is supported by both the client RPCSS process and the RPCSS process (i.e., server RPCSS process), and returns a server remote string binding for the server process for that selected protocol. In step 501, the method selects the highest priority common protocol between the client RPCSS process and the server RPCSS process. The priority of the protocols may be indicated in the registry by the ordering of the installed protocols. Because the server RPCSS process selects the protocol for all the server processes executing on the server computer system, all communications tend to use a single protocol with the highest priority. The use of a single, or at least a limited number of protocols, tends to reduce the amount of system resources allocated for communications. In addition, the highest priority protocol can be one that is particularly well adapted for the particular network configuration of the client and server computer systems. In step 502, the method determines whether the server process identified by the passed Oxid has already registered the selected protocol by checking the Oxid/Protocol table. If the server process has already registered the selected protocol, then the method returns the server remote string binding for the selected protocol to the client computer system, else the method continues at step 503. In step 503, the method gets the RPC handle for the passed Oxid. The RPC handle identifies the server process to the RPC component. In step 504, the method invokes the method UseProtSeq of the IORCallback interface passing the RPC handle of the server process and the selected protocol. The invoked method returns the server string binding. In step 505, the method registers the Oxid as using the selected protocol and server remote string binding in the Oxid/Protocol table and the method then returns.

FIG. 6 is a flow diagram of an implementation of the method ClientResolveOxid of the ILocalObjectExporter interface. The method is passed the server RPCSS string bindings and the Oxid of the server process to which a client process is to connect. The method retrieves the server remote string binding either from its Oxid/SSB table or from the server RPCSS process and returns it to the client process. In step 601, if the Oxid/SSB table contains an entry for the combination of the server RPCSS string bindings and the Oxid, then the client RPCSS process has cached a server remote string binding for the server process and the method returns, else the method continues at step 602. The combination of server RPCSS string bindings and Oxid uniquely identifies each server process within the network of computer systems. In step 602, the method creates a server RPCSS string binding with a well-known endpoint from the server RPCSS string bindings received from the server process. Alternatively, a server RPCSS process need not use well-known remote endpoints. Instead, the server RPCSS string binding sent by a server process to a client process could include the server remote endpoints assigned to the server RPCSS process by the RPC component. In this way, the client RPCSS process need not know the server RPCSS remote endpoints in advance. In step 603, the method sends the Oxid and the identifications of the protocols that the client RPCSS process supports to the server RPCSS process. In step 604, the method waits until a message containing the server remote string binding is received. In step 605, the method caches the server remote string binding indexed by the server RPCSS string bindings and Oxid and then returns.

Figure 7:
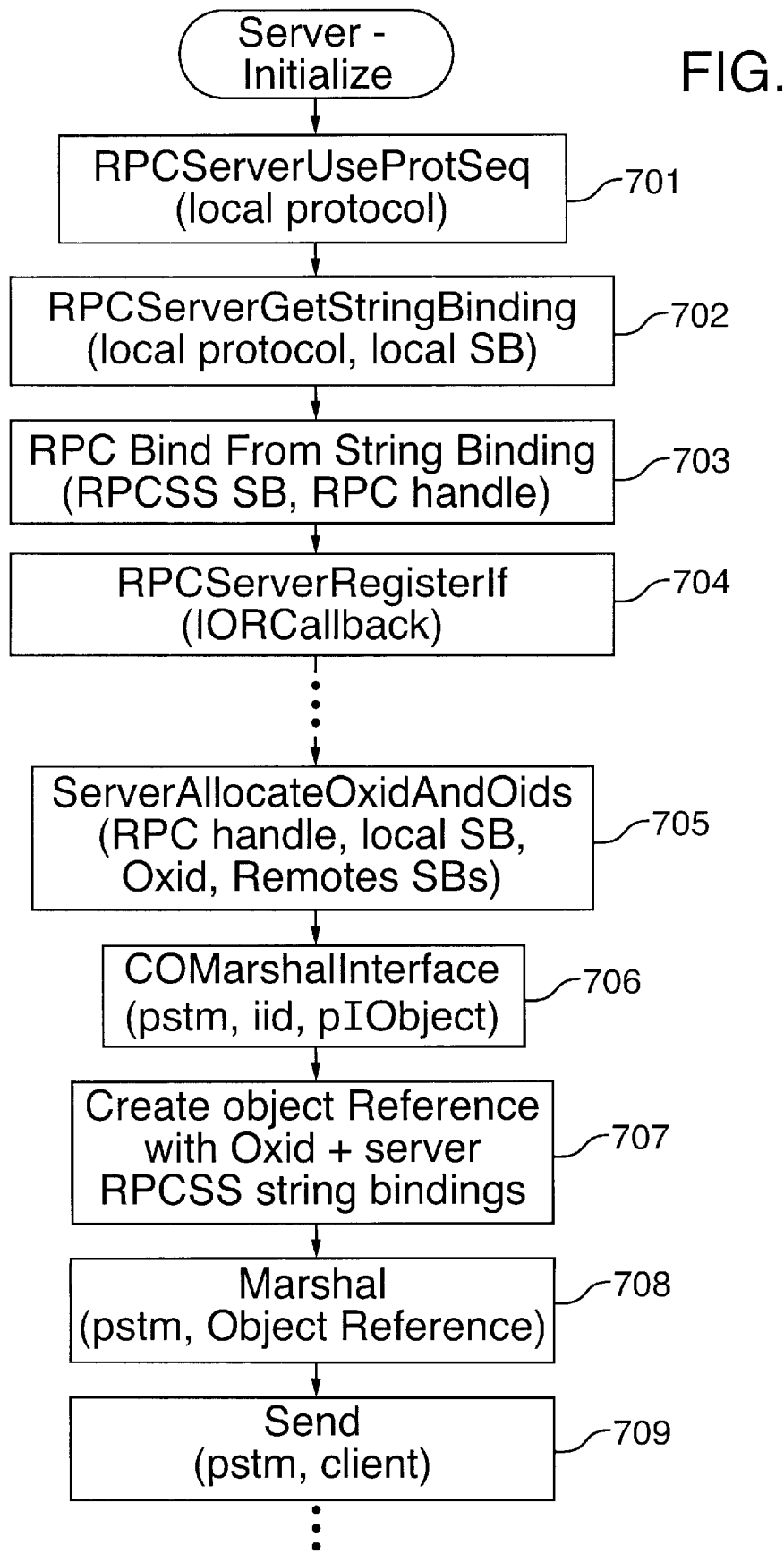
FIG. 7 is a flow diagram of the routine to initialize a server process.

FIG. 7 is a flow diagram of the routine to initialize a server process. The routine registers a local protocol that can be used by local processes to communicate with the server process and registers its IORCallback with the RPC component. When the routine marshals the interface pointer to a client process, it retrieves its Oxid and the server RPCSS string bindings from the server RPCSS process and sends them to the client process. In step 701, the routine invokes the function RpcServerUseProtSeq to register the local protocol (e.g., lightweight RPC) with the RPC component. In step 702, the routine invokes the function RpcServerGetStringBinding to retrieve the string binding for the local protocol for the server process from the RPC component. In step 703, the routine invokes the function RpcBindFromStringBinding to retrieve the RPC handle for the server RPCSS process. The server process communicates with the server RPCSS process via a well-known endpoint. In step 704, the routine registers the IORCallback interface with the RPC component. The method UseProtSeq of the IORCallback interface is invoked by the server RPCSS process to effect the delayed registration of a protocol. In step 705, the routine invokes the routine ServerAllocateOxidAndOids to retrieve an Oxid for the server process and the server RPCSS string bindings. In step 708, the routine invokes the function CoMarshalinterface to marshal the IOject interface. In step 707, the routine creates an object reference that contains the Oxid and the server RPCSS string bindings. In step 708, the routine marshals the object reference into a stream. In step 709, the routine sends the stream to a previously known remote endpoint of the client process. The client remote endpoint can be made known to the server process in many different ways. For example, it could be a well-known endpoint known when the server process was developed or it could be an endpoint whose identification was broadcast on the network.

Figure 8:
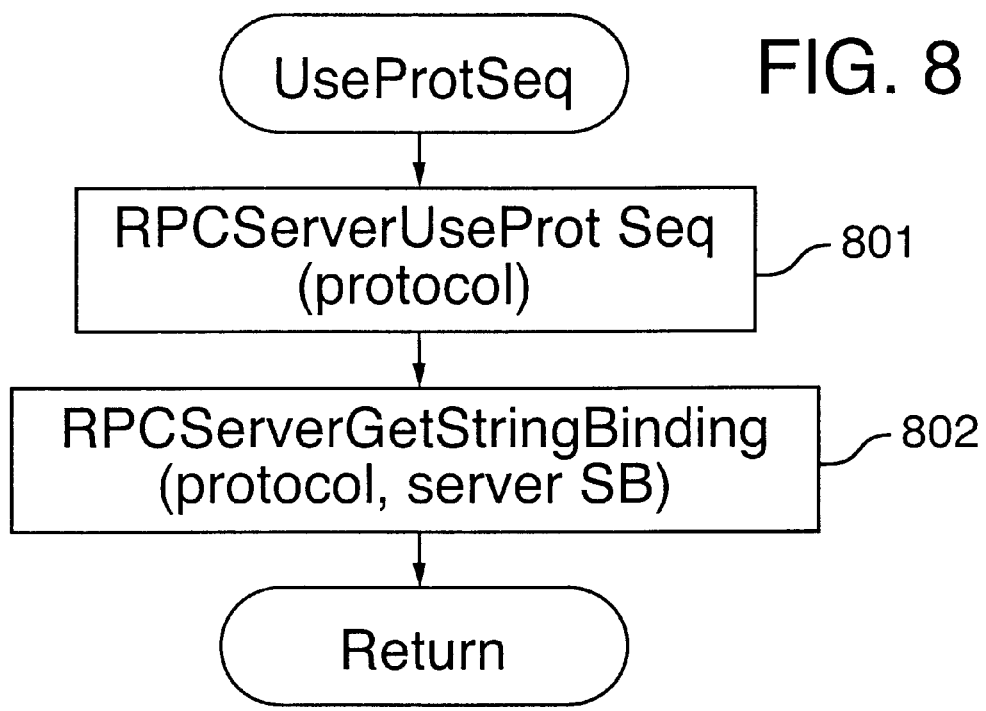
FIG. 8 is a flow diagram of an implementation of the method UseProtSeq of the IORCallback.

FIG. 8 is a flow diagram of an implementation of the method UseProtSeq of the IORCallback. This method is passed the identification of a protocol that the server process is requested to register. The method registers the protocol and returns the server remote string binding with the endpoint of the server process that uses that protocol. In step 801, the method invokes the function RpcServerUseProtSeq passing the identification of the protocol to be registered. In step 802, the method invokes the function RpcServerGetStringBinding passing the identification of the protocol and receives in return the server remote string binding for the registered protocol and then returns.

Figure 9:
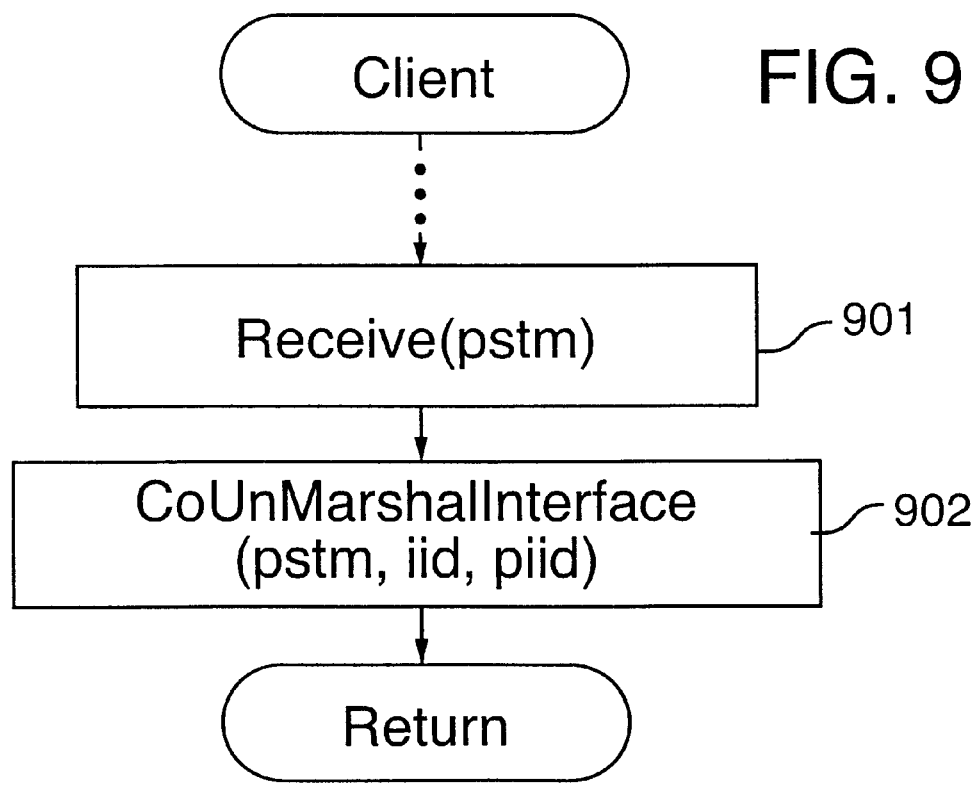
FIG. 9 is a flow diagram of an implementation of a portion of the client process.

FIG. 9 is a flow diagram of an implementation of a portion of the client process. In this portion, the client process has posted a receive message request on its remote endpoint that is known to the server process. When a message is received on that remote endpoint, the client process unmarshals the interface. In step 901, the routine invokes a Receive function of the RPC component to wait for a message. In step 902, the routine invokes the function CoUnMarshalInterface to unmarshal the interface passed in the message and return.

Figure 10:
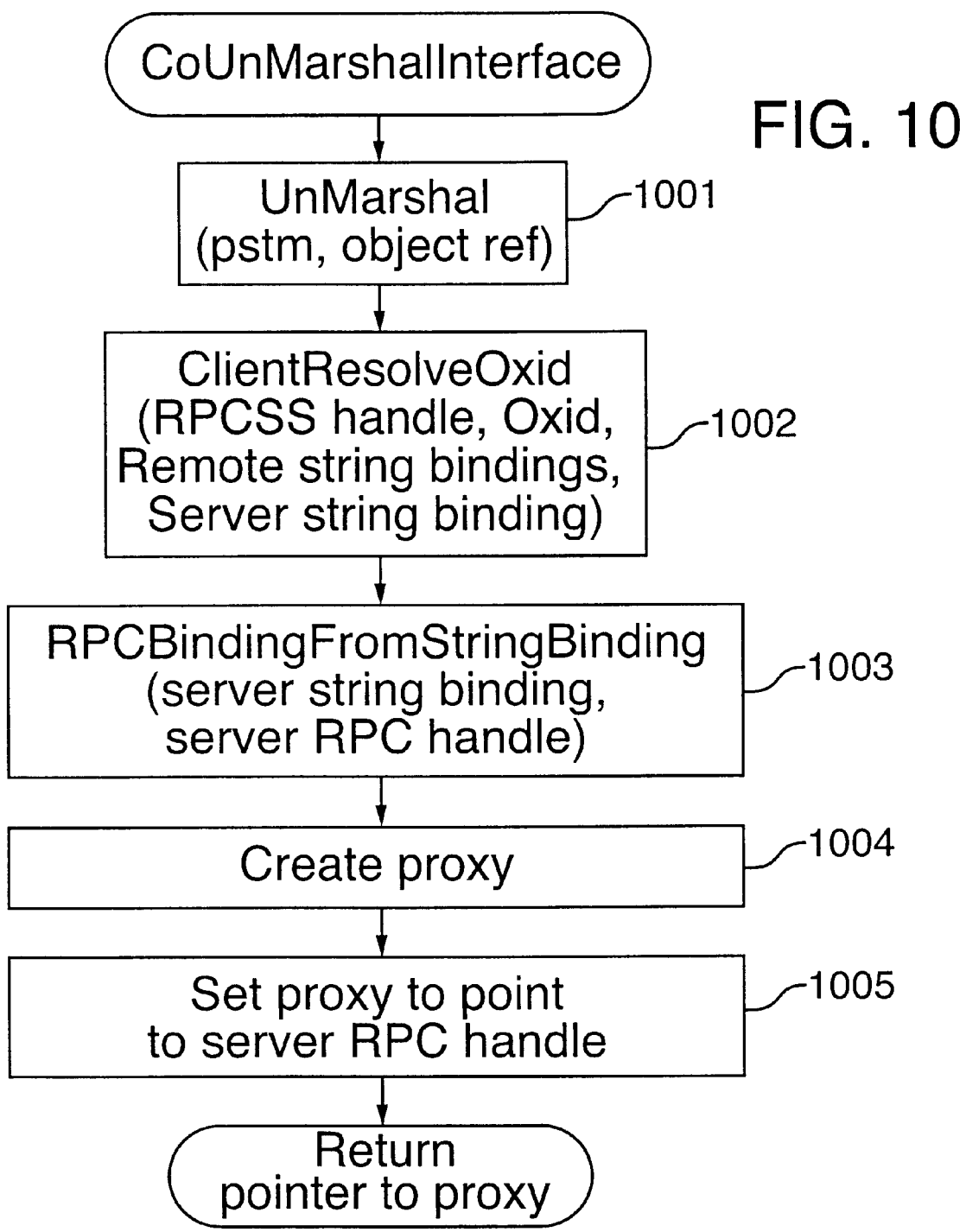
FIG. 10 is a flow diagram of an implementation of the function CoUnMarshalInterface.

FIG. 10 is a flow diagram of an implementation of the function CoUnMarshalInterface. The function performs the normal processing to unmarshal an interface pointer, such as creating a proxy object, and retrieves the server remote string binding and stores it in the proxy object. In step 1001, the function invokes the function UnMarshal to retrieve the object reference from the received message. In step 1002, the routine invokes the method ClientResolveOxid of the ILocalObjectExporter interface of the client RPCSS process. The routine passes the Oxid and the server RPCSS string bindings that were unmarshaled from the message received from the server process. The CoUnMarshalInterface routine receives in return the server remote string binding. In step 1003, the routine invokes the function RpcBindFromStringBinding passing the server remote string binding and receiving an RPC handle that identifies the server process. In step 1004, the routine creates a proxy object for the IObject interface. In step 1005, the routine sets the proxy object to point to the server RPC handle and returns a pointer to the proxy object. The client process can then invoke the methods of the proxy object to effect the invocation of the methods of the interface pointed to by the unmarshaled interface pointer.

Figure 11:
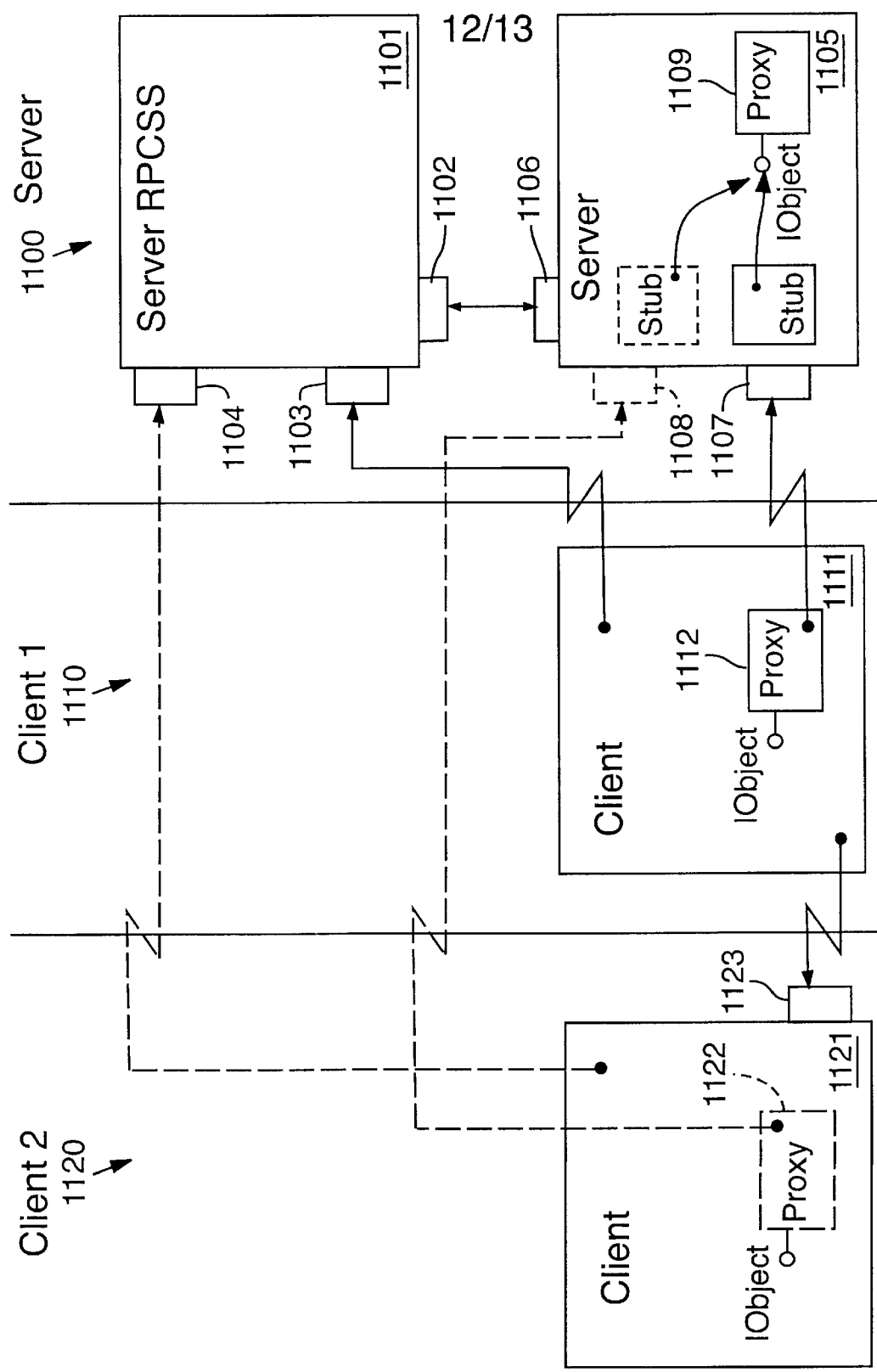
FIG. 11 is a block diagram illustrating delayed protocol registration when a marshaled interface pointer is itself marshaled to another client.

FIG. 11 is a block diagram illustrating delayed protocol registration when a marshaled interface pointer is itself marshaled to another client. When one client process marshals an interface pointer to another client process, that other client process may not support the same protocol that the first client process used to communicate with the server process. When the other client process requests to communicate directly with the server process over the other protocol, the server process can at that time effect delayed registration of that other protocol. The server process 1105 has marshaled a pointer to the IObject interface 1109 to the client process 1111 of the client computer system 1110. The client process 1111 notified the server RPCSS process that it was to communicate with the server process 1105 via a certain protocol. The server RPCSS process notified the server process 1105 which registered that protocol and returned an indication of the server endpoint 1107. The client process 1111 then stored an indication of that server endpoint and its proxy object. The client process 1111 then marshaled a pointer to its IObject interface to the client process 1121 on the second client computer system 1120. However, the client process 1121 may be unable to communicate with the server process 1105 using the protocol registered at endpoint 1107. In such a case, the client process sends a notification to the server RPCSS process requesting that it communicate with the server process using a different protocol. The server RPCSS sends the request to the server process which registers the different protocol at server endpoint 1108. The server process returns an indication of that server endpoint to the server RPCSS process which returns that endpoint to the client process 1121. That server endpoint is stored in the proxy object 1122 so that the client process 1121 can communicate directly with the server process using the other protocol.

Figure 12:
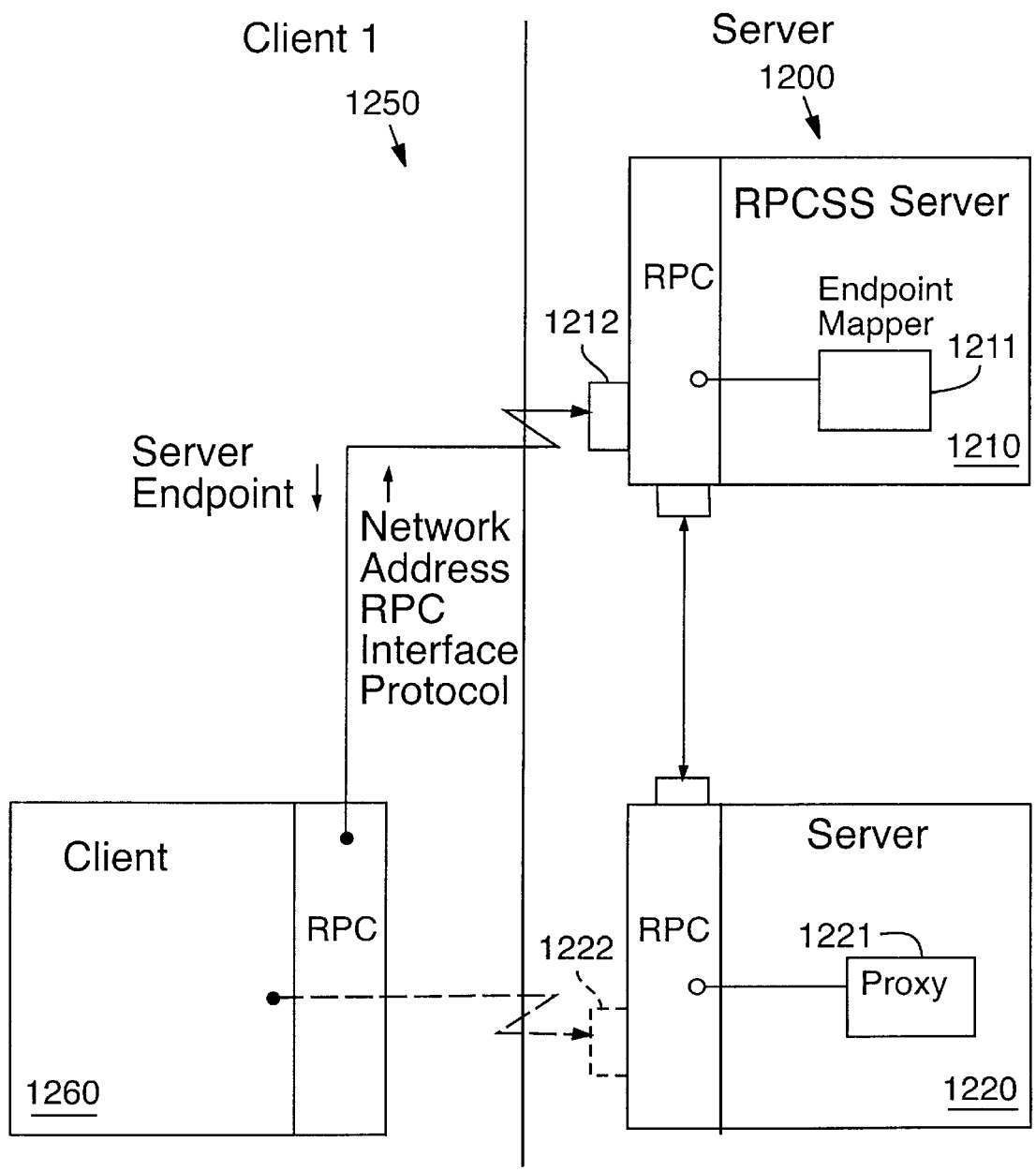
FIG. 12 is a block diagram illustrating delayed protocol registration initiated by a client process.

FIG. 12 is a block diagram illustrating delayed protocol registration initiated by a client process. A client process can initiate delayed protocol registration without receiving any communications from the server process. In particular, the client process may want to communicate with any server that provides a certain function. The client process 1260 executing on the client computer system 1250 requests to be connected to an RPC interface (e.g., a certain function) of the server computer system 1200 using a specified protocol. That is, the client is requested to be connected to any server 1220 on the server computer system 1200 that provides an implementation of that RPC interface. The client computer system sends to the server computer system at a well-known endpoint the identification of the RPC interface and an identification of the protocol. That well-known endpoint provides access to an endpoint mapper function 1211 that is provided by the server RPCSS process 1210. The endpoint mapper function maintains mappings from RPC interfaces to server processes that have registered an implementation of various RPC interfaces. The endpoint mapper determines that server process 1220 has registered an implementation 1221 of the requested RPC interface. The endpoint mapper then requests the server process, assuming that the protocol is not already registered, to register the requested protocol. The server process registers the protocol and returns the identification of the endpoint 1222 to the server RPCSS process. The server RPCSS process then returns the server endpoint to the client process 1220. The client process can then use that server endpoint to access the RPC interface of the server process 1220.

From the foregoing it will be appreciated that, although specific embodiments of the invention have been described herein for purposes of illustration, various modifications may be made without deviating from the spirit and scope of the invention. For example, the communications process, the server process, and the client process can each be executing in different computers. However, in such a case the communications and server process would communicate via a remote protocol. The Appendix contains a detailed description of the Component Object Model. Accordingly, the invention is not limited except as by the appended claims.

What is claimed is:

1. A method for delaying registration of a protocol for communicating between a client process and a server process on a computer system until requested by the client process, the computer system having a communications process, the method comprising:

registering for the communications process a protocol at a communications endpoint;

sending to the client process an identification of the registered protocol;

receiving from the client process via the communications endpoint an indication that the client process is to communicate with the server process and an indication that the client process supports the protocol registered for the communications process; and in response to receiving the indications, registering for the server process the protocol at a server endpoint.

2. The method of claim 1 wherein the communications endpoint is predefined.

3. The method of claim 1 wherein the sending of the identification of the registered protocol includes sending an identification of the communications endpoint.

4. The method of claim 1 wherein the server process and the client process execute on different computer systems.

5. The method of claim 1 wherein the communications process and the server process execute on different computer systems.

6. The method of claim 1 wherein the registering of the protocol includes registering a plurality of protocols supported by the communications process.

7. The method of claim 1 wherein the receiving from the client process via the communications endpoint includes receiving an indication of a protocol supported by the client process.

8. The method of claim 1 wherein the communications process caches an identification of endpoints for protocols registered by the server process.

9. A method for delayed registration of a protocol for communicating between a client process and a server process on a computer system when requested by the client process, the computer system having a communications process, the method comprising:
   registering for the communications process a plurality of protocols at communications endpoints;
   sending to the client process identifications of the registered protocols;
   receiving from the client process via a communications endpoint an indication that the client process is to communicate with the server process and an identification of one or more protocols supported by the client; and
   in response to receiving the indication,
      selecting one of the identified protocols supported by the client process that is registered for the communications process; and
      registering for the server process the selected protocol at a server endpoint.

10. The method of claim 9 including sending to the server process an identification of the server endpoint.

11. The method of claim 9 wherein the server endpoint is wellknown to the client process.

12. The method of claim 9 wherein the communications process caches an identification of the server endpoint so that when a subsequent indication is received from a client process to communicate with the server process using the protocol, the communications process can retrieve the identification of the server endpoint from the cache.

13. A method in a computer system for delayed registration of protocols for server processes, the method comprising:
   executing a communications process that registers a communications protocol at a communications endpoint;
   executing a plurality of server processes wherein each server process registers a protocol for communication with the communications process;
   receiving at the communications endpoint a request from a client process to communicate with a server process over a specified protocol; and
   in response to receiving the request,
      directing the server process to register the specified protocol;
      registering the specified protocol for the server process; and
      notifying the client process that it can communicate with the server process using the specified protocol.

14. The method of claim 13 wherein after receiving the notification the client process communicates with the server process via the specified protocol over a predefined endpoint.

15. The method of claim 13 wherein when notifying the client process, the communications process provides an identification of an endpoint of the server process allocated to the specified protocol.

16. The method of claim 13 wherein the client process identifies the server process by specifying an interface implemented by the server process.

17. The method of claim 13 wherein the client process identifies the server process by specifying a unique identification of the server process.

18. The method of claim 13 wherein when another client process requests communication with the same server process using the specified protocol, the communication process notifies the client process without directing the server process to re-register the protocol.

19. The method of claim 13 wherein the client process provides a plurality of specified protocols and the communications process selects a specified protocol that is supported by the server process.

20. A computer-readable medium containing instructions for causing a computer system to delay registration of protocols for server processes, by:
   executing a communications process that registers a communications protocol at a communications endpoint;
   executing a plurality of server processes wherein each server process registers a protocol for communication with the communications process;
   receiving at the communications endpoint a request from a client process to communicate with a server process over a specified protocol; and
   in response to receiving the request,
      directing the server process to register the specified protocol;
      registering the specified protocol for the server process; and
      notifying the client process that it can communicate with the server process using the specified protocol.

21. The computer-readable medium of claim 20 wherein after receiving the notification the client process communicates with the server process via the specified protocol over a predefined endpoint.

22. The computer-readable medium of claim 20 wherein when notifying the client process, the communications process provides an identification of an endpoint of the server process allocated to the specified protocol.

23. The computer-readable medium of claim 20 wherein the client process identifies the server process by specifying an interface implemented by the server process.

24. The computer-readable medium of claim 20 wherein the client process identifies the server process by specifying a unique identification of the server process.

25. The computer-readable medium of claim 20 wherein when another client process requests communication with the same server process using the specified protocol, the communication process notifies the client process without directing the server process to re-register the protocol.

26. The computer-readable medium of claim 20 wherein the client process provides a plurality of specified protocols and the communications process selects a specified protocol that is supported by the server process.

27. A computer-readable medium containing instructions for delaying registration of a protocol for communicating between a client process and a server process on a computer system until requested by the client process, the computer system having a communications process, by:

registering for the communications process a protocol at a communications endpoint;

sending from the server process to the client process an identification of the registered protocol;

receiving from the client process via the communications endpoint an indication that the client process is to communicate with the server process and an indication that the client process supports the protocol registered for the communications process; and registering for the server process the protocol at a server endpoint.

28. The computer-readable medium of claim 27 wherein the communications endpoint is predefined.

29. The computer-readable medium of claim 27 wherein the sending of the identification of the registered protocol includes sending an identification of the communications endpoint.

30. The computer-readable medium of claim 27 wherein the server process and the client process execute on different computer systems.

31. The computer-readable medium of claim 27 wherein the communications process and the server process execute on different computer systems.

32. The method of claim 27 wherein the registering of the protocol includes registering a plurality of protocols supported by the communications process.

33. A computer system for delayed registration of a protocol, the computer system comprising:

a communications component that registers a plurality of protocols, that receives requests using a registered protocol from clients to communicate with servers using a designated protocol, that in response to receiving the requests, directs servers to register the designated protocol, and that notifies the clients that they can communicate with the servers; and a server component that receives a directive from the communications component to register a designated protocol and registers the designated protocol to effect the delayed registration of the designated protocol.

34. The computer system of claim 33 wherein the communications component receives a plurality of designated protocols, selects one of the designated protocols, and directs the server component to register the selected protocol.

35. A method in a computer system for delayed registration of a protocol by a first process, the method comprising:

registering a first protocol that is supported by a second process;

receiving from the second process a request for the first process to register a second protocol, the request being sent in the registered first protocol; and in response to receiving the request, registering the second protocol for the first process whereby the registration of the second protocol is delayed until requested by the second process.

36. The method of claim 35 including after registration of the second protocol, communicating between the first and second processes using the second protocol.

37. The method of claim 35 wherein the registering of the first protocol and the receiving from the second process of a request is performed by a communications process.

38. The method of claim 37 wherein the communications process receives requests for multiple processes to register a protocol.

39. The method of claim 37 wherein the first protocol and the second protocol are the same protocol.

40. The method of claim 37 wherein the communications process notifies the first process to register the second protocol.

41. The method of claim 37 wherein the communications process notifies the second process of an endpoint of the first process that supports the second protocol.

42. The method of claim 37 wherein after registering the first protocol, the communications process notifies the second process so that the second process can send the request to the communications process via the first protocol.

43. The method of claim 35 wherein the registering of the first protocol and the receiving of the request are performed by the first process.

44. The method of claim 43 wherein the first process receives requests to register protocols from multiple processes.

45. The method of claim 35 wherein after registering the first protocol, notifying the second process so that the second process can send the request via the first protocol.

46. The method of claim 43 wherein after registering the first protocol, the first process notifies the second process so that the second process can send the request to the first process via the first protocol.

47. The method of claim 35 wherein when a protocol is registered by a process, the process can then communicate using the registered protocol.

\* \* \* \* \*

UNITED STATES PATENT AND TRADEMARK OFFICE
CERTIFICATE OF CORRECTION

PATENT NO. : 6,208,952 B1  
DATED : March 27, 2001  
INVENTOR(S) : Goertzel et al.

Page 1 of 1

It is certified that error appears in the above-identified patent and that said Letters Patent is hereby corrected as shown below:

Column 7,
Line 16, "ILocaIObjectExporter" should read -- ILocalObjectExporter --
Line 19, "wellknown" should read -- well known --
Line 30, "RegisterIf'" should read -- RegisterIf --

Column 8,
Line 57, "CoMarshalinterface" should read -- CoMarshalInterface --

Column 9,
Line 9, "Servcr" should read -- Server --

Column 11,
Line 47, "wellknown" should read -- well known --

Signed and Sealed this

Fourth Day of December, 2001

Attest:

*Attesting Officer*

NICHOLAS P. GODICI
*Acting Director of the United States Patent and Trademark Office*